(12) United States Patent
Kombowski (10) Patent No.: US 9,140,347 B2
(45) Date of Patent: Sep. 22, 2015

(54) FORCE TRANSFER DEVICE

(75) Inventor: Eugen Kombowski, Buehl (DE)

(73) Assignee: Schaeffler Technologies AG & Co. KG (DE)

(*) Notice: Subject to any disclaimer, the term of this patent is extended or adjusted under 35 U.S.C. 154(b) by 1151 days.

(21) Appl. No.: 12/070,014

(22) Filed: Feb. 14, 2008

(65) Prior Publication Data
US 2008/0202880 A1    Aug. 28, 2008

(30) Foreign Application Priority Data
Feb. 15, 2007  (DE) .......................... 10 2007 007 426

(51) Int. Cl.
*F16H 45/02* (2006.01)
*F16F 15/123* (2006.01)

(52) U.S. Cl.
CPC ........ *F16H 45/02* (2013.01); *F16H 2045/0247* (2013.01); *F16H 2045/0278* (2013.01); *F16H 2045/0294* (2013.01)

(58) Field of Classification Search
CPC ............ F16H 2045/0247; F16H 45/02; F16H 2045/0294

USPC .................. 192/3.28, 3.29, 55.61, 70.17, 212
See application file for complete search history.

(56) References Cited

U.S. PATENT DOCUMENTS

| | | | | |
|---|---|---|---|---|
| 5,975,261 | A * | 11/1999 | Woerner et al. .............. | 192/3.29 |
| 6,142,272 | A * | 11/2000 | Meisner et al. .............. | 192/3.29 |
| 6,223,872 | B1 * | 5/2001 | Heller et al. ................. | 192/3.29 |
| 7,775,335 | B2 * | 8/2010 | Maienschein et al. ....... | 192/3.29 |
| 2007/0137963 | A1 * | 6/2007 | Maienschein et al. ....... | 192/3.29 |

\* cited by examiner

*Primary Examiner* — Terry Chau
*(74) Attorney, Agent, or Firm* — Simpson & Simpson, PLLC (57) ABSTRACT

A force transfer device, comprising a hub, disposed in the drive train of a motor vehicle for torque transfer between a drive unit and a transmission, in particular a turbine shell hub of a turbine shell of a hydrodynamic machine, coupled to a damper hub with a vibration damper device connected in between. The vibration damping device is provided with a mechanical stop device, which becomes effective, as soon as a maximum design load of the vibration damping device is exceeded, and the mechanical stop device is disposed between the turbine shell hub and the damper hub.

10 Claims, 6 Drawing Sheets

FORCE TRANSFER DEVICE

CROSS REFERENCE TO RELATED APPLICATIONS

This patent claims priority of German Patent Application No. 10 2007 007 426.5 filed Feb. 15, 2007, which application is incorporated herein by reference.

FIELD OF THE INVENTION

The invention relates to a force transfer device, comprising a hub disposed in the drive train of a motor vehicle for transferring torque between a drive unit and a transmission, in particular a turbine shell hub of a turbine shell of a hydrodynamic machine, which is coupled to a damper hub, with a vibration damping device connected in between.

BACKGROUND OF THE INVENTION

Force transfer devices for use in drive trains between a drive engine and an input, in particular a transmission unit, are known in a plurality of embodiments. They typically comprise a hydrodynamic machine provided as a hydrodynamic speed/torque converter or a hydrodynamic clutch, an actuatable clutch for circumventing the power transmission through the hydrodynamic machine, and a vibration damping device. Preferably, the vibration damping device in the form of a rotation vibration damper is disposed in the force flow from the input to the output respectively, subsequent to the hydrodynamic machine and also subsequent to the actuatable clutch, so that a damping is performed in any operating state. The vibration damping device thus acts as an elastic clutch, this means it transfers torque and simultaneously compensates for inconsistencies in rotation, and thus has to be designed for the maximum torque to be transferred. The vibration damping device comprises in the force flow, viewed from the input to the output of the force transfer device, an input component and an output component, which are disposed concentric, and coupled amongst each other by a means for spring and/or damping coupling, wherein the input component and the output component can be rotated relative to each other in circumferential direction within limits, due to the coupling amongst each other. The means for spring and/or damping coupling are thus configured with respect to a permissible maximum torque, and exposed to enormously high loads, when this and larger moments occur.

BRIEF SUMMARY OF THE INVENTION

It is the object of the invention to refine a force transfer device so that it has a higher service life than conventional force transfer devices.

The object is accomplished in a force transfer device, comprising a hub disposed in a drive train of a motor vehicle for torque transfer between a drive unit and a transmission, in particular a turbine shell hub of a turbine shell of a hydrodynamic machine, which is coupled to a damper hub, with a vibration damping device connected in between, so that a mechanical stop device for limiting the rotation angle is associated with the vibration damping device, which becomes effective when a maximum design load of the vibration damping device is exceeded. According to the invention, this mechanical stop device is not provided within the vibration damping device, but between the damper hub and the turbine shell hub. This provides the advantage that on the one hand the vibration damping device is effectively protected against overload, wherein any load is to be considered an overload, which exceeds the damper design capacity, and furthermore the force transmitting components of the damper and thus including the spring elements, which act in the damper, are protected. Due to the disposition of the stop device between the turbine shell hub and the damper hub, it is moved into a portion, which on the one hand is disposed as close as possible to the axis of rotation, and furthermore characterized by a compact construction, wherein the available installation space can be used for providing reinforced elements of the stop means without requiring additional installation space. The more massive embodiment leads to a higher stiffness, and also to a durability of the respective elements of the stop means, which are exposed to very high loads. The particular elements of the vibration damping device can be provided independently from the stop device, depending on the embodiment.

A preferred embodiment of the force transfer device is characterized in that the stop means comprises stop elements, in particular in the form of stop fingers at the turbine shell hub, which extend into the gaps between the stop limiter elements at the damper hub, and which interact with the stop limiter elements upon a rotation with maximum design load. The particular interspace at the damper hub is thus defined in circumferential direction by two stop limiter elements. Through the selection of the distances between two stop elements, disposed adjacent in circumferential direction and the stop elements and the associated stop limiter elements, or the distance between two stop limiter elements, disposed adjacent to each other in circumferential direction, and the width of a stop element, the maximum rotation angle between the turbine shell hub and the damper hub can be adjusted.

The force transfer device comprises at least one input and one output, wherein the output can be formed by a transmission input shaft. The damper hub is coupled with the output, preferably connected directly non-rotatably. The coupling of the turbine shell with the damper hub and thus with the output is performed indirectly through the vibration damping device, in particular the coupling of the turbine shell with an input component of the vibration damping device. The input component thus preferably comprises a disk shaped element in the form of an engaging disk, which is free from a direct non-rotatable coupling with the damper hub. The coupling between the turbine shell and the input component is performed through the turbine shell hub. Between the hub and the input component, coupling elements are provided, preferably allowing a form locked connection. Other embodiments are conceivable, e.g., also a friction locking. According to a preferred embodiment, however a form locking is selected. For this purpose, engaging elements, which are complementary to each other, are provided on the input component and on the turbine shell hub, which are designated as coupling elements, and which are preferably provided in the form of alternating protrusions and recesses, engaging into each other, and thus allowing a power transfer. For disposing the coupling elements and the elements of the stop device, viewed in axial direction between the input and the output, there are a plurality of options. Preferably, however, assemblies are selected, which are characterized by a space saving configuration, in axial and also in radial direction. The selection of the assembly option thus also depends on the functional association.

A particularly preferred embodiment is characterized in that the function of stop elements is assigned to at least one, preferably several coupling elements, so that the coupling elements form a quasi integral unit with the stop elements or form the stop elements themselves. The functional concentration facilitates a particular installation space optimized assembly in an axial plane, which is characterized by the rotation axis and by an orthogonal to the rotation axis. In case of a functional separation, which can be useful under certain circumstances, the coupling elements and the stop elements are disposed at the turbine shell hub preferably offset to each other in a radial direction. In case of a functional concentration, an assembly is preferably provided, which does not have an offset from one another in an axial direction.

According to a particularly preferred embodiment with functional concentration, the coupling between the turbine shell hub and the input component and the disposition of the stop means is performed in one axial plane, this means within each other in a radial direction. In this case, preferably coupling elements are disposed at the turbine shell hub on an annular surface, which is aligned in an axial direction, or which points in an axial direction, wherein the coupling elements extend from the annular surface, and are aligned in a radial direction, wherein the coupling elements interact with coupling elements at the input component of the vibration damping device, which are complementary and point in a radial direction in the direction of the rotation axis, by engaging the gaps between two adjacently disposed coupling elements on the engaging disk. In the same axial plane, preferably the mechanical stop means are disposed, in particular the stop elements at the turbine shell hub and the limiter elements at the damper hub, wherein the stop elements at the turbine shell hub are preferably formed directly by several coupling elements. In order to avoid imbalances, the formation is performed symmetrically. This means, that each $n^{th}$ coupling element (with n>1) is provided at the turbine shell hub as a stop element. In an embodiment in one axial plane, thus the respective engaging portions and the elements engaging them are preferably provided in a radial direction. The stop elements at the turbine shell are formed at the coupling elements, disposed offset from the annular surface in an axial direction, wherein the coupling elements simultaneously facilitate engaging the input component of the vibration damping device. Thus, all elements which can be brought into operative engagement with each other are disposed in one axial plane with respect to their operating portion. An offset is possible in an axial and also in a radial direction as described above.

The solution according to the invention is not limited to a particular embodiment of a force transfer device with a hydrodynamic machine, in particular a hydrodynamic speed/torque converter or a hydrodynamic clutch, and an actuatable clutch means associated with the hydrodynamic machine, comprising a vibration damping device, which is disposed respectively, viewed in a power transfer between input and output, between the actuatable coupling device and the output, or between the hydrodynamic machine and the output. It is important that the turbine shell and also the damper hub are supported at the output, in particular at the transmission input shaft forming the output, or coupled to the transmission input shaft at least indirectly, this means either directly, or with additional elements, also speed transformation means, connected in between. This solution according to the invention is suitable for all embodiments comprising a vibration damping device connected subsequent to the turbine shell or the actuatable clutch.

BRIEF DESCRIPTION OF THE DRAWINGS

This solution according to the invention is subsequently described with reference to figures. Therein, the following is illustrated in particular.

DETAILED DESCRIPTION OF THE INVENTION

Figure 1:
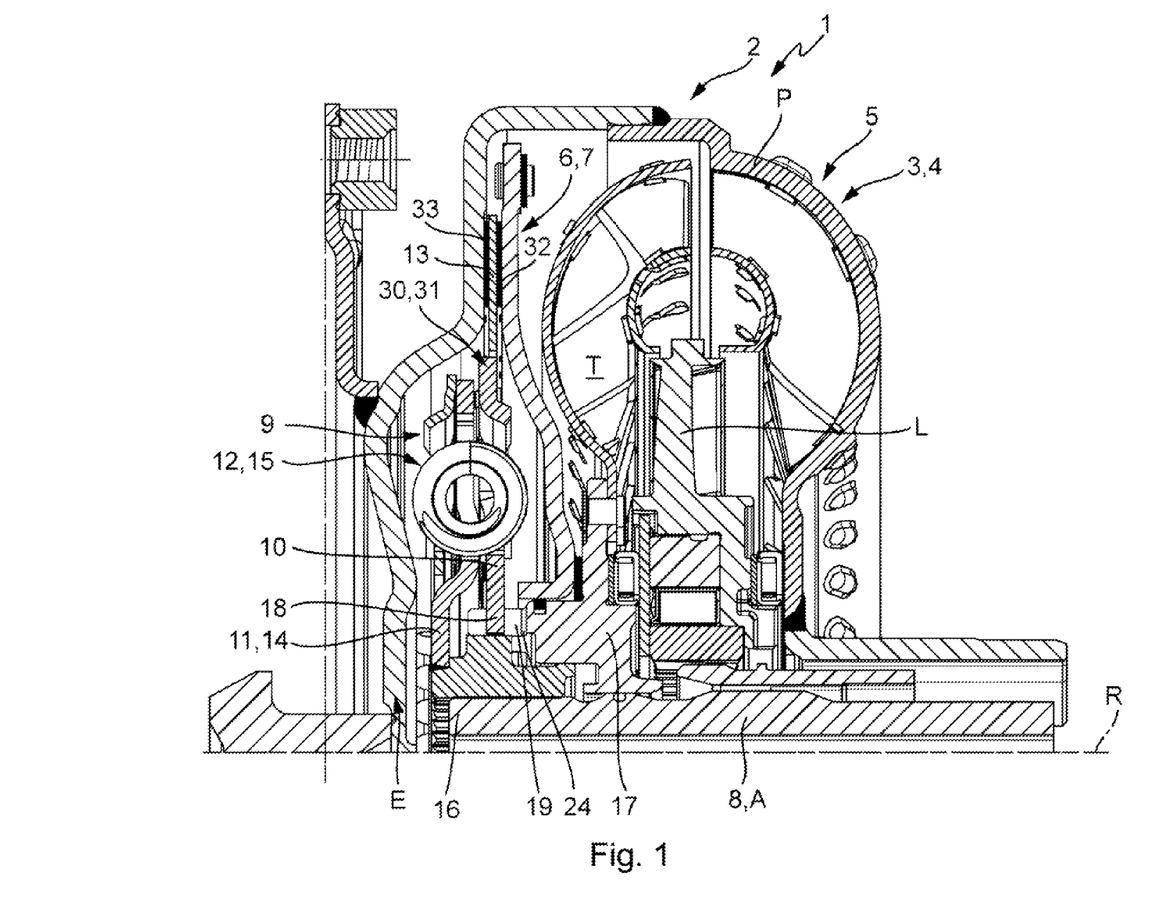
FIG. 1 illustrates an axial sectional view of the force transfer device, comprising a vibration damping device comprising a stop device according to the invention.
Figure 2:
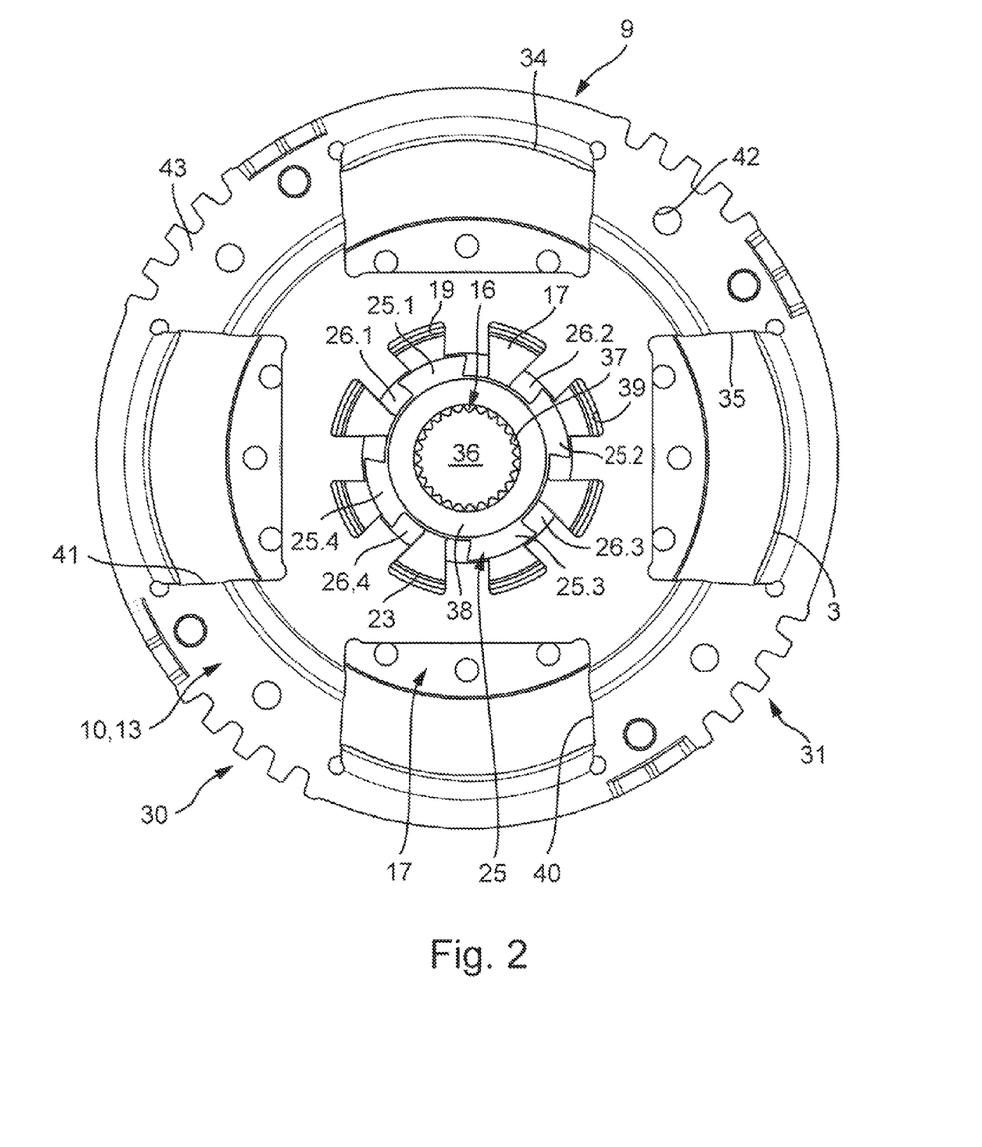
FIG. 2 illustrates a top view according to FIG. 1 of an engaging disk comprising a damper hub and a turbine shell hub of the vibration damping device.
Figure 3:
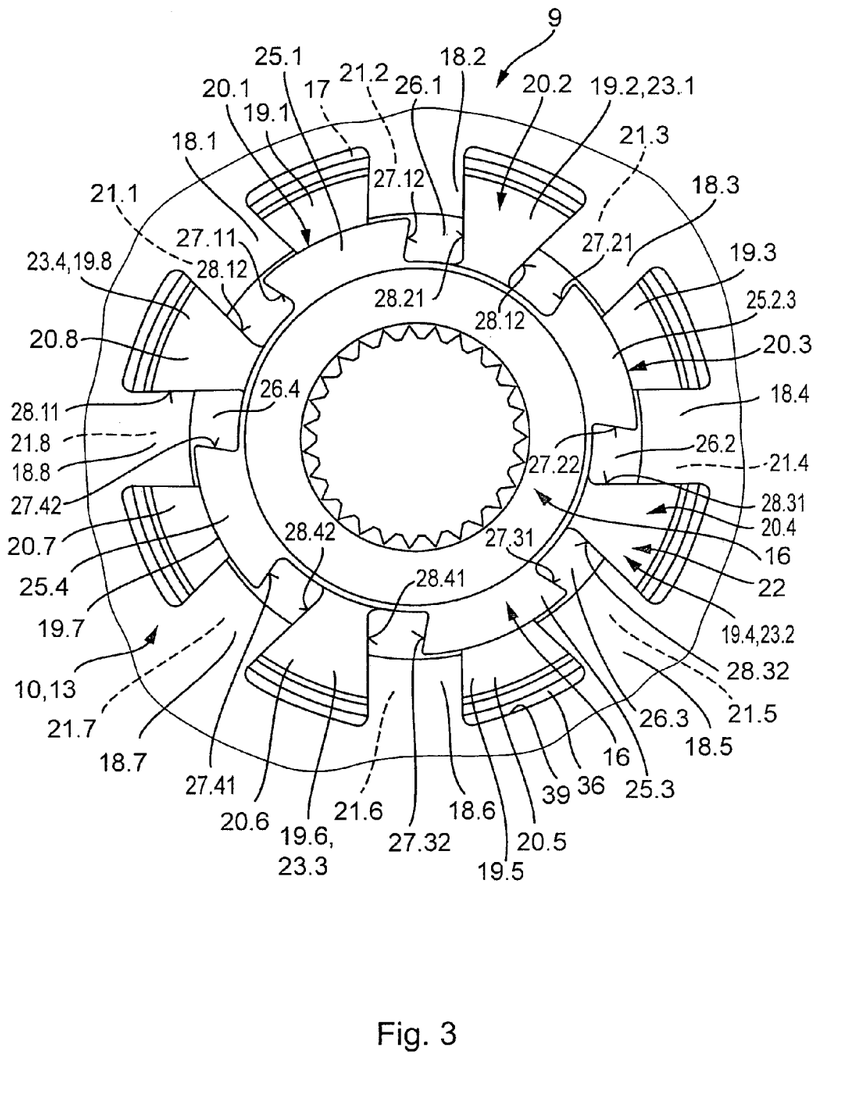
FIG. 3 illustrates a blown up detail according to FIG. 2 in a sectional view through the connection plane of the stop device, in particular in a top view of the stop limiter elements at the damper hub.

FIG. 1 illustrates force transfer device 2 in an axial sectional view, based on a detail of power train 1 of a motor vehicle, which is disposed between a drive unit, which is not shown, in particular a combustion engine, from which a crank shaft extends, and a transmission. FIGS. 2 and 3 relate to additional views, therefore the subsequent description relates to FIGS. 1, 2, 3. Force transfer device 2 comprises at least one input E and one output A. The crank shaft of the combustion engine is thus connected non-rotatably with input E, by a drive plate, which is also designated as a flex plate. Force transfer device 2 comprises hydrodynamic machine 3, in particular hydrodynamic speed/torque converter 4, by means of which hydrodynamic power path 5 can be lined out between input E and output A. Furthermore, means for an at least partial circumvention of the power transfer through hydrodynamic power path 5 is provided. This is provided in the form of actuatable clutch device 6, wherein, in case of a power transfer only through actuatable clutch device 6 between input E and output A, the clutch device forms second power path 7. Hydrodynamic speed/torque converter 4 comprises at least one first bladed shell, functioning as pump shell P, and a second bladed shell, functioning as turbine shell T, wherein turbine shell T is connected at least indirectly to output A, while pump shell P is coupled at least indirectly non-rotatably to input E of force transfer device 2. "At least indirectly" means that the coupling is performed directly, or with additional transfer elements, or components connected in between. The power transfer can thus be performed respectively through a particular power path 5 or 7, or through both power paths 5, 7 in a power split. Output A of force transfer device 2 is typically formed by a shaft, which simultaneously also functions as transmission input shaft 8. The coupling of actuatable clutch device 6 and hydrodynamic machine 3 with transmission input shaft 8 is thus not performed directly, but by means of vibration damping device 9. The vibration damping device comprises input component 10 and output component 11, coupled amongst each other by means 12 for spring and/or damping coupling. Vibration damping device 9 thus functions as an elastic coupling device, which is simultaneously capable to compensate for vibrations. Input component 10 and output component 11 can thus be provided in one or more components. Input component 10 thus comprises, in the simplest case, engaging disk 13. Output component 11 comprises or forms damper flange 14, wherein engaging disk 13 is coupled to damper flange 14 of vibration damping device 9 in a known manner with energy storage elements 15, in particular arced springs, or other elastic elements connected in between. Energy storage elements 15 form means 12 for spring and damping coupling. Output component 11, in particular damper flange 14, is connected non-rotatably with damper hub 16. The non-rotatable connection is performed preferably through material continuity by means of a welded connection. Damper hub 16 is connected non-rotatably with transmission input shaft 8 of the transmission and thus with output A. The non-rotatable coupling is preferably performed at the radially inner portion, e.g., by means of a spline connection, or another type of form or friction locked connection.

Turbine shell T is connected non-rotatably with turbine shell hub 17. The connection is performed, e.g., by means of rivet connection elements. Turbine shell hub 17 is disposed rotatably, relative to input shaft 8. Between turbine shell T and pump shell P, at least one stator shell L is disposed in an embodiment as a hydrodynamic speed/torque converter in a known manner. The coupling of turbine shell T with input component 9 for damping vibrations is performed through coupling turbine shell hub 17 with engaging disk 13. The connection is performed form locked, preferably directly non-rotatably. This form locking is performed by means of coupling elements 18, disposed at engaging disk 13, designated as 18.1 through 18.8, in the illustrations according to FIGS. 2 and 3, which can be brought into operative engagement with coupling elements 19, provided in a complementary manner thereto, in particular stop elements 19.1 through 19.8, at turbine shell hub 17. These coupling elements 18.1 through 18.8 are preferably provided as protrusions, extending in an axial and/or radial direction in the portion of inner circumference 39 at engaging disk 13, wherein the protrusions are disposed adjacently in a circumferential direction, forming interspaces in a circumferential direction. Coupling elements 19 include two groups of coupling elements aligned in a circumferential direction and alternating with each other in the circumferential direction. For example, stop elements 19.1, 19.3, 19.5, and 19.7 alternate with stop elements 19.2, 19.4, 19.6, and 19.8 in the circumferential direction. One of the two groups of coupling elements 19, for example stop elements 19.2, 19.4, 19.6 and 19.8 includes respective first portions alternating with the other group of stop elements, for example, stop elements 19.2, 19.4, 19.6, and 19.8, in the circumferential direction and stop elements, for example stop elements 23.1 to 23.4 extending radially inward from first portions. The interspaces between coupling elements 18.1 through 18.8 are designated as 20.1 through 20.8 and the interspaces between 19.1 through 19.8 at the turbine shell hub are designated as 21.1 through 21.8. According to the invention, mechanical stop device 22 for limiting the rotatability of input component 10 and output component 11 relative to each other in a circumferential direction is associated with vibration damping device 9, which becomes effective, as soon as a maximum design load of device 9 for damping vibrations has been exceeded. Mechanical stop device 22 is provided according to the invention between turbine shell hub 17 and damper hub 16. For this purpose, stop elements 23, in particular 23.1 to 23.4 noted above, are provided at turbine shell hub 17, which are preferably provided in the form of so-called stop fingers, this means as protrusions disposed in an axial direction at ring surface 24 of turbine shell hub 17, and extending in an axial and/or radial direction, which are disposed offset relative to each other in a circumferential direction. The stop fingers interact with stop limiter elements, or radially projecting stop elements, 25.1 through 25.4 at damper hub 16, wherein stop elements, 23.1 through 23.4 protrude into interspaces 26.1 through 26.4 between particular stop limiter elements, 25.1 through 25.4, and these interspaces 26.1 through 26.4 extend in a circumferential direction and are preferably provided in the form of circular segment arcs, and provide a limited rotatability of stop elements, 23.1 through 23.4 in a circumferential direction, until stop limiter elements, 25.1 through 25.4, in particular stop surfaces 27.11 through 27.42 formed by them, come into contact. Thus, the functions of the non-rotatable coupling between engaging disk 13 and turbine shell 17 and mechanical stop means 22 can be fulfilled in a spatially and functionally separate manner, or can be integrated.

According to a particularly preferred embodiment of the solution according to the invention, however, the functions of stop elements 23.1 through 23.4 are transferred to a portion of coupling elements 19.1 through 19.8. This is also performed by a portion of the coupling elements, in this case 19.2, 19.4, 19.6, and 19.8, forming stop elements 23.1 to 23.4 by providing them enlarged and providing them, so that they additionally protrude into interspaces 26.1 through 26.4, between stop limiter elements 25.1 through 25.4 at damper hub 16.

By making the rotation angle limiter part of the turbine hub the elements of the rotation angle limiter can be made more robust. Further, the rotation angle limiter does not require additional radial space beyond that already in place for the turbine hub. By providing the stop elements, or the stop limiter elements more massive in cross section, a higher stiffness and durability of the elements can be accomplished, which is particularly useful in this portion, in order not to suffer any damage to the rotation angle limiter, provided in the form of mechanical stop means 22, under high loads.

FIG. 1 illustrates such an embodiment in axial cross section, based on a force transfer device. FIG. 2, on the other hand, illustrates turbine shell hub 17, engaging disc 13, and damper hub 16, while leaving away all other parts, in a top view, viewed from input E in assembled state. Engaging disk 13, in particular input component 10 is substantially configured as a circular annular disk. The disk comprises several teething portions 30, 31, 42, 43 in its radial outer portion. The disks are used to connect engaging disk 13 non-rotatably, but axially movable to clutch component 32, in particular to output side clutch component 32 of actuatable clutch device 6. When providing actuatable clutch device 6 in the form of a friction locked clutch, in particular a multi-disk clutch, teething portions 30 and 31 are used for a non-rotatable, but axially movable coupling with friction disk 33 according to FIG. 1. Furthermore, engaging disk 13 comprises four windows 34, 35, 40, 41, which are used in a known manner for receiving the energy storage elements of means 12 for spring and/or damping coupling. On the radial inside, this means in the portion of inner circumference 39, engaging disk 13 comprises pass-through opening 36. Damper hub 16 is disposed concentric to engaging disk 13, and partially extends through pass-through opening 36. Damper hub 16 is furthermore provided with inner teething 37. Inner teething 37 is provided on the inside of a substantially tubular damper hub body, from which annular surface 38 is visible in FIG. 2. At this ring surface 38, four stop limiter elements 25.1 through 25.4 are disposed in an exemplary manner. They extend in an axial and/or radial direction and respectively comprise the shape of a circular arc segment, wherein stop limiter elements 25.1 through 25.4 are evenly distributed over the circumference of an axial or a radial annular surface 38, forming interspaces 26.1 through 26.4. The particularly formed interspace 26.1 through 26.4 is furthermore also preferably provided in the shape of a circular arc segment. Thus, respective stop element 23.1 through 23.4 protrudes into these interspaces 26.1 to 26.4. These stop elements 23.1 to 23.4 provided as stop fingers at turbine hub 17 also extend in an axial and/or radial direction. Stop fingers 23.1 through 23.4 are thus integrally connected or provided with turbine shell hub 17, and disposed with an even spacing in circumferential direction. Due to the distances in a circumferential direction between stop fingers 23.1 and 23.4 and stop limiter elements 25.1 through 25.4, or between their stop surfaces 27.11 through 27.42 and 28.11 through 28.42, facing in a circumferential direction, the size of the relative rotation angle between engaging disk 13 and damper hub 16 is determined through the coupling of engaging disk 13 of turbine shell hub 17, and thus directly of turbine shell hub 17 and damper hub 16.

Figure 4:
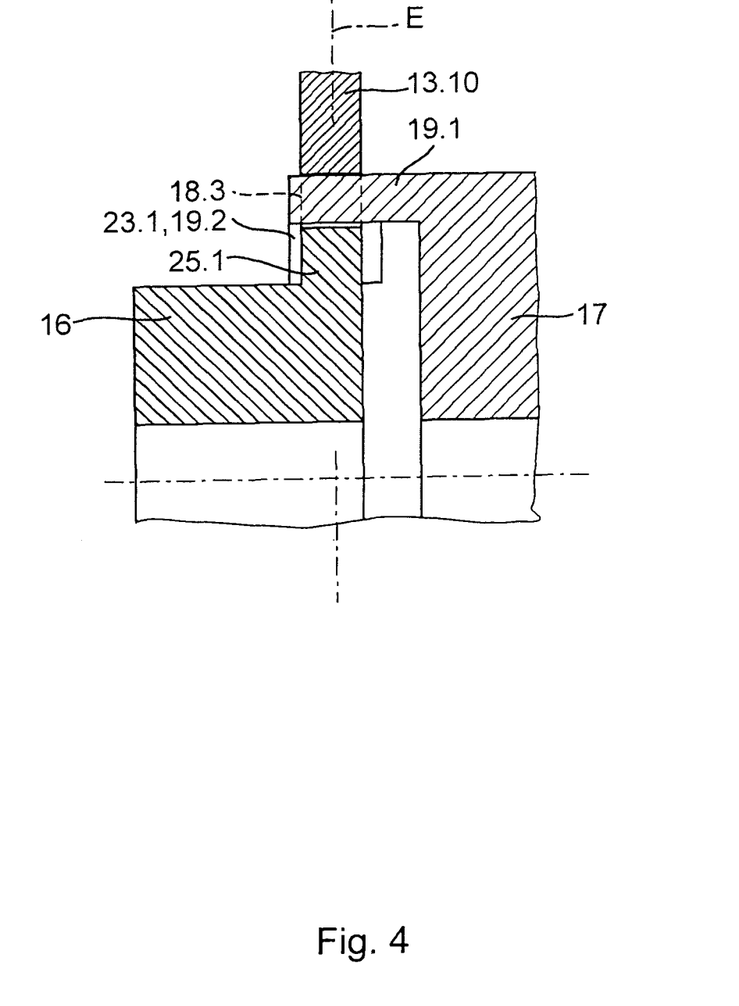
FIG. 4 illustrates the disposition of the operating portions of the stop means and of the coupling between the turbine shell hub and the input component of the vibration damping device in one plane.

FIG. 3 again illustrates a detail of FIG. 2 in an enlarged view, in which engaging disk 13, damper hub 16, and turbine shell hub 17, and stop elements 23.1 through 23.4, stop limiters 25.1 through 25.4 and coupling elements 18.1 through 18.8 and 19.1 through 19.8, disposed thereon, are disposed. The illustration is performed here in a sectional view in top view through damper hub 16. From this it is evident, that coupling elements 18.1 through 18.8 form pass-through opening 36, this means in the radially inner portion of engaging disk 13 of input component 10, extending in a radial direction. The extension in a radial direction inward is performed so that coupling elements 18.1 through 18.8 are free from a possible coupling or contact with damper hub 16. This means coupling elements 18.1 through 18.8 are at least characterized by an interior diameter or interior circumference, which is larger than the exterior circumference in this plane in the portion of damper hub 16. An interaction with stop limiter elements 25.1 through 25.4 at damper hub 16 is thus excluded. The coupling with turbine shell hub 17 is performed by means of engaging interspaces 21.1 through 21.8 at turbine shell hub 17 between coupling elements 19.1 through 19.8. The coupling is preferably performed without clearance, so that an entirely non-rotatable connection and form locking can be accomplished here. According to the invention, in an embodiment according to FIGS. 1 through 3, due to the functional concentration at coupling elements 19.1 through 19.8 through providing coupling elements 19.2, 19.4, 19.6, 19.8 simultaneously as stop elements 23.1 through 23.4, the realization of the rotation angle limiter is performed by means of damper hub 16, by forming stop elements 23.1 through 23.4, which are formed by coupling elements 19.2, 19.4, 19.6, and 19.8, enlarged in a radial direction, so that engaging interspaces 26.1 through 26.4 becomes possible. Preferably, as described in FIG. 3, the disposition of the non-rotatable connection between engaging disk 13 and turbine shell hub 17 and the rotation angle limiter between damper hub 16 and turbine shell hub 17 will be performed in one plane, which can be described by theoretical rotation axis R of the force transfer device, and by an orthogonal to the rotation axis. This is schematically depicted in an axial sectional view in FIG. 4. From this it becomes evident, that the coupling or the engagement between particular elements damper hub 16 and turbine shell hub 17 and engaging disk 13 is performed in one plane E, and therefore requires the smallest installation space possible in axial direction.

In the embodiment illustrated in FIG. 3, second coupling element, 19.2, 19.4, 19.6, 19.8, is provided reinforced. Depending on the embodiment and the configuration, the reinforcement is performed in a radial and/or axial direction.

For an embodiment, according to the FIGS. 1 through 4, the conditions in the particular operating states are illustrated based on a flat projection. For simplification, the teethings, resulting from stop elements 23.1 through 23.3, stop limiter elements 25.1 through 25.4, and coupling elements 18.1 through 18.8, 19.1 through 19.8, are shown quasi flat projected. The solid line thus illustrates the embodiment of coupling elements 18.1 through 18.8, in this case in an exemplary manner 18.2 through 18.6, at engaging disk 13. The depiction in broken lines illustrates the embodiment of stop limiter elements 25.1 to 25.4 at the hub, in this case in an exemplary manner 25.2 and 25.3, and the punctuated depiction illustrates the embodiment of stop elements 23.1 through 23.4 at turbine shell hub 17. From this it becomes evident, that the embodiment of coupling elements 18.1 through 18.8 is performed with the same teething height, while the configuration of stop elements 23.1 through 23.4, in this case 23.1 and 23.2, which are formed by coupling elements 19.2 and 19.4, is formed with a larger height in a radial direction, so that an engagement of interspaces 26.1 through 26.4, in this case 26.1 and 26.2, is possible between stop limiter elements 25.1 and 25.2, or 25.2 and 25.3 at damper hub 16, while remaining coupling elements 19.3, 19.5 correspond in their teething height to the teething height of coupling elements 18.1 through 18.8, and do not extend into interspaces 26.1 and 26.2.

Figure 5A:
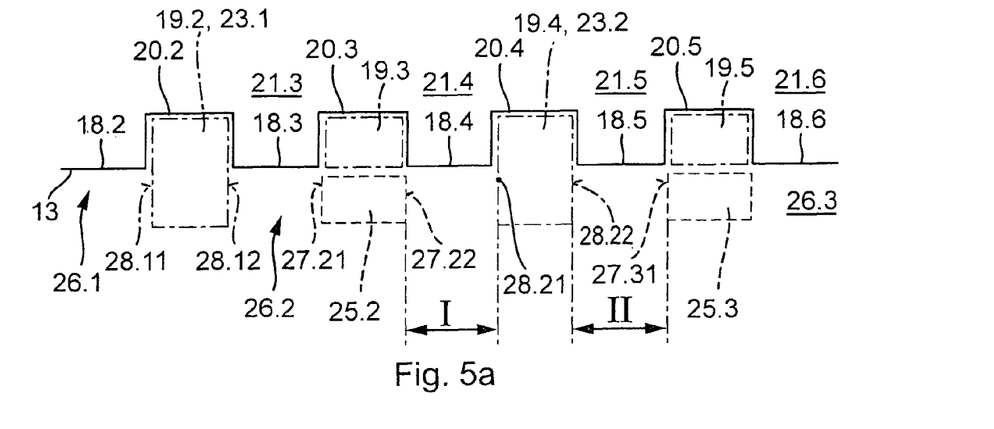
FIGS. 5a through 5c illustrate the relative positioning of the stop elements, stop limiter elements, and coupling elements in particular operating conditions in a simplified schematic illustration, based on flat projection.

FIG. 5a thus illustrates the unloaded state with an illustration of the relative positioning of the particular elements at damper hub 16, turbine shell hub 17, and engaging disk 13. Coupling elements 19.2 through 19.5 and thus also stop elements 23.1 and 23.2 engage interspaces 20.2 through 20.5 between coupling elements 18.2 through 18.6. Stop elements 23.1 and 23.2 formed by coupling elements 19.2 and 19.4 engage here interspaces 26.1 and 26.2; however, they are disposed offset in a circumferential direction with their surfaces 28.11, 28.12, 28.21, 28.22, pointing towards stop surfaces 27.21 or 27.22 and 27.31 at stop limiter elements 25.2 and 25.3, so that there is no contact at all also in this case. The distance between stop surfaces 27.21 and the adjacent stop element, in particular of stop surface 28.12 or 27.22 and 28.21 or 27.21 and 28.22, thus characterizes the possible rotation angle. Depending on the direction of operation, this means the rotation angle in the pull, or the rotation in the push direction. The possible rotation angle range in the pull direction is designated as I and the rotation angle in the push direction is designated as II.

Figure 5B:
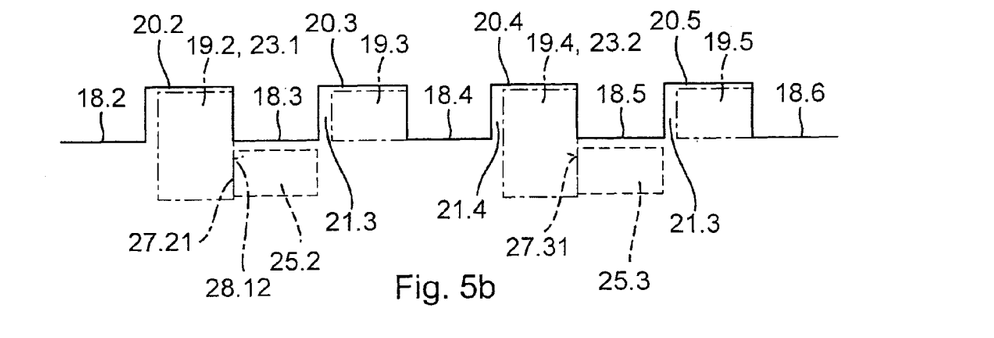

In a loaded state during power transmission through hydrodynamic power path 5, this means during torque converter operation, the moment is transferred through turbine shell T. Coupling elements 19.1 through 19.8 thus transmit the maximum damper moment to engaging disk 13; stop elements 23.1, 23.2, upon reaching the rotation limit angle I or II through contact at stop surfaces 27.21 or 27.31 they transfer the overload moment.

Figure 5C:
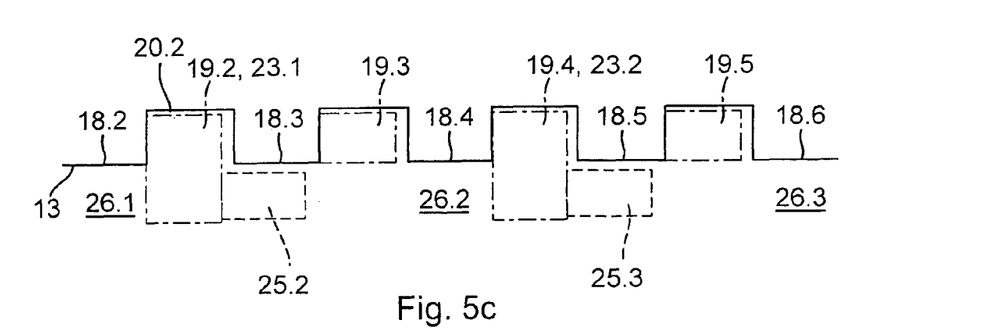

FIG. 5c, on the other hand, illustrates the power transmission through force transfer device 2 in mechanical power path 7, this means through actuatable clutch device 6, circumventing hydrodynamic power path 5. In this case, the moment is inducted through engaging disk 13. The engaging disk interacts with coupling elements 19.1 through 19.8, and thus also with stop elements 23.1 through 23.4, and contacts stop surfaces provided at the stop elements, facilitating a torque transfer. In this case, furthermore by means of stop elements 23.1 through 23.4, after reaching maximum rotation angle I, the stop at stop limiter elements 25.1 through 25.4 of damper hub

16 is reached. Stop elements 23.1 through 23.4 then only transfer the overload moment.

The embodiments according to the FIGS. 1 through 5 illustrate particularly preferred embodiments. However, in an exemplary manner, possible assemblies and associations of stop elements 23.1 through 23.4, stop limiter elements 25.2 through 25.4, and of coupling elements 18.1 through 18.8, 19.1 through 19.8 are shown relative to each other. As described above, depending on the type of assembly, the elements can be disposed in one plane or in different axial and radial planes.

Figure 6A:
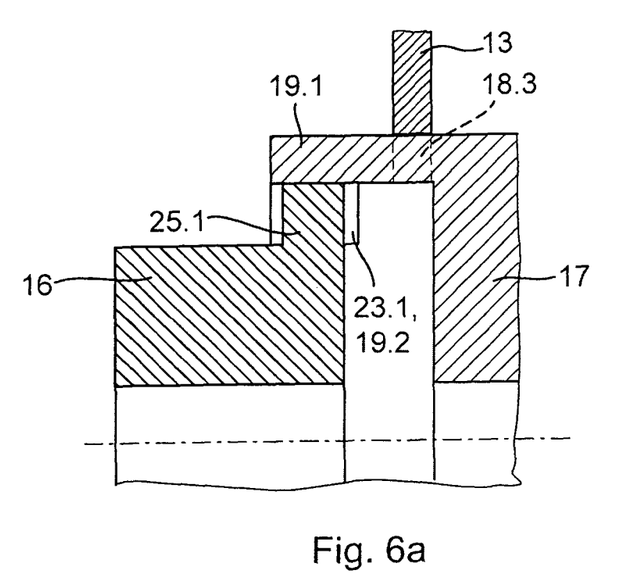
FIG. 6a illustrates a modification of an embodiment according to FIG. 4 in a schematic simplified view, comprising a disposition of the mechanical stop means and coupling elements, offset in an axial direction and in a radial direction; and, FIG. 6b illustrates an embodiment with a functional separation between the coupling elements and the elements of the mechanical stop means in an exemplary manner.

FIG. 6a thus illustrates an embodiment with an assembly in two different axial planes, wherein the engagement of engaging disk 13 in turbine shell hub 17 is performed by means of coupling elements 18.1 through 18.8, 19.1 through 19.8 in an axially offset manner, relative to the stop limiter between turbine shell hub 17 and damper hub 16, this means stop limiter elements 25.1 through 25.4 and stop elements 23.1 through 23.4.

Figure 6B:
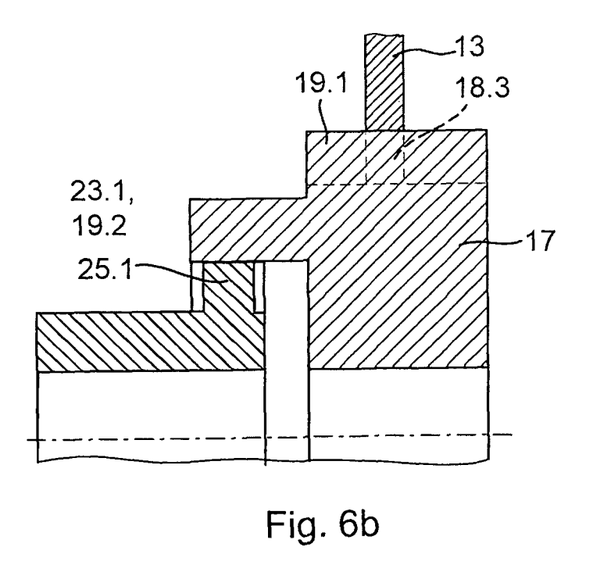

On the other hand, FIG. 6b illustrates an embodiment without functional concentration. From this it becomes evident that the functional association is performed directly only relative to coupling elements 19.1 through 19.8 for non-rotatable connection, and stop elements 23.1 through 23.4 for providing the rotation angle limiter. In this case, coupling elements 19.1 through 19.8 and stop elements 23.1 through 23.4 are disposed offset relative to each other in a radial direction and/or in an axial direction. In the illustrated case, they are offset in a radial direction in an exemplary manner.

DESIGNATIONS 1 drive train
2 force transfer device
3 hydrodynamic machine
4 hydrodynamic speed/torque converter
5 hydrodynamic power path
6 actuatable clutch device
7 second power path
8 transmission input shaft
9 vibration damper device
10 input component
11 output component
12 spring and/or damper coupling means
13 engaging disk
14 damper flange
15 energy storage elements
16 damper hub
17 turbine shell hub
18.1-18.8 coupling elements
19.1-19.8 coupling elements
20.1-20.8 interspace
21.1-21.8 interspace
22 mechanical stop means
23.1-23.4 stop elements
24 annular surface
25.1-25.4 stop limiter elements
26.1-26.4 interspace
27.11-27.42 stop surfaces
28.11-28.42 stop surfaces
30 teething portion
31 teething portion
32 clutch component
33 friction disk
34 window
35 window
36 pass-through opening
37 inner teething
38 annular surface
E input
A output
P pump shell
T turbine shell
L stator shell
I rotation angle coasting operation
II rotation angle propulsion operation

What is claimed is:

1. A force transfer device (2), comprising:
   a vibration damper device including:
      an input component including a plurality of coupling elements extending toward an axis of rotation for the force transfer device in a radial direction orthogonal to the axis of rotation;
      an output component; and,
      at least one spring engaged with the input component and the output component to enable relative rotation of the input component with respect to the output component;
   a turbine shell forming an outer circumference of a turbine;
   a turbine shell hub (17) connected to the turbine shell such that rotation of the turbine shell hub is locked to rotation of the turbine shell, and including:
      a portion arranged to contact an input shaft for a transmission while being rotatable with respect to the input shaft;
      a first plurality of stop elements:
         extending from the portion of the turbine shell hub in an axial direction parallel to the axis of rotation; and
         engaged with the plurality of coupling elements such that rotation of the plurality of coupling elements is locked to rotation of the first plurality of stop elements; and,
      a second plurality of stop elements including:
         respective first portions:
            extending from the portion of the turbine shell hub in the axial direction;
            engaged with the plurality of coupling elements such that rotation of the plurality of coupling elements is locked to rotation of the second plurality of stop elements; and,
            aligned with and alternating with respective stop elements from the first plurality of stop elements in a circumferential direction; and,
         a third plurality of stop elements:
            extending from the respective first portions in the radial direction toward the axis of rotation; and,
            radially inward of the first plurality of stop elements; and,
   a damper hub (16):
      connected to the output component such that rotation of the damper hub is locked to rotation of the output component;
      arranged to engage the input shaft for the transmission to transmit torque to the input shaft; and,
      including a fourth plurality of stop elements:
         extending in the radial direction away from the axis of rotation;
         at least partially aligned with the third plurality of stop elements in the circumferential direction; and,
         when the load on the force transfer device is less than the maximum design load, at least partly aligned with the second plurality of stop elements in the radial direction and separated from the third plurality of stop elements by second respective spaces in the circumferential direction.

2. The force transfer device (2) recited in claim 1, wherein the plurality of coupling elements extends into interspaces between the first plurality of stop elements, and wherein the size of the interspaces, viewed in a circumferential direction, exceeds the width of the plurality of coupling elements.

3. The force transfer device (2) recited in claim 1, wherein the plurality of coupling elements is aligned with the turbine shell hub (17) an axial direction.

4. The force transfer device (2) recited in claim 1, wherein the plurality of coupling elements is aligned with the damper hub (16) in a radial direction.

5. The force transfer device (2) recited in claim 1, wherein the first plurality of stop elements is aligned with the damper hub (16) in a radial direction.

6. The force transfer device (2) recited in claim 1, wherein the first plurality of stop elements is aligned with the damper hub (16) in an axial direction.

7. The force transfer device (2) recited in claim 1, wherein the plurality of coupling elements is disposed at the turbine shell hub (17) with even respective distances from each other in circumferential direction and the first plurality of stop elements is disposed at the damper hub (16) with even respective distances from each other in the circumferential direction.

8. The force transfer device (2) recited in claim 1, wherein the first plurality of stop elements is provided as circular arc segment shaped elements, integrally formed with the turbine shell hub (17).

9. The force transfer device (2) recited in claim 1, wherein the first and second pluralities of stop elements, and the plurality of coupling elements are disposed at the input component (10), respectively offset from one another in circumferential direction, forming interspaces (20.1 through 20.8; 21.1 through 21.8), and the first plurality of stop engage the interspaces (20.1 through 20.8) between the plurality of coupling elements at the input component (10).

10. The force transfer device (2) recited in claim 9, wherein the engaging occurs without clearance.

\* \* \* \* \*